United States Patent [19]

Scaramucci

[11] Patent Number: 4,796,663
[45] Date of Patent: Jan. 10, 1989

[54] FABRICATED CHECK VALVE CONSTRUCTION

[76] Inventor: John P. Scaramucci, 10724 Woodridden, Oklahoma City, Okla. 73170

[21] Appl. No.: 196,447

[22] Filed: May 20, 1988

[51] Int. Cl.$^4$ ............................................. F16K 15/03
[52] U.S. Cl. ............................... 137/515.5; 137/527.8
[58] Field of Search .................... 137/515.5, 527–527.8

[56] References Cited

U.S. PATENT DOCUMENTS 1,827,913  10/1931  Rymal ............................. 137/527.8
3,191,619   6/1965  Allen ................................ 137/527.4

FOREIGN PATENT DOCUMENTS 2079406  1/1982  United Kingdom ............. 137/527.8

*Primary Examiner*—Robert G. Nilson
*Attorney, Agent, or Firm*—Dunlap, Codding, Peterson

[57] ABSTRACT

A fabricated swing check valve where the valve body is in the form of a pair of tubular sections welded together in end-to-end relation. The valve seat and cage, with hinge pin hanger, are positioned in a counterbore in the inner end of one of the body sections and may be formed separately or as portions of one of the body sections. A retainer ring may be employed to hold the disc hinge pin on the hanger for the hinge pin, and the opposite ends of the valve body may be internally threaded with standard pipe threads for an economical construction.

15 Claims, 3 Drawing Sheets

FABRICATED CHECK VALVE CONSTRUCTION

CROSS-REFERENCES TO RELATED APPLICATIONS

Related subject matter is disclosed in U.S. Ser. No. 023,786, filed Mar. 9, 1987, entitled Check Valve, now abandoned; U.S. Ser. No. 049,383, filed May 13, 1987, entitled Swing Check Valve; U.S. Ser. No. 059,398, filed June 9, 1987, entitled Swing Check Valve Cartridge; U.S. Ser. No. 060,249, filed June 9, 1987, entitled Swing Check Valve Disc; U.S. Ser. No. 078,410, filed July 27, 1987, entitled Swing Check Valve With Hinge Pin Insert; and U.S. Ser. No. 077,907, filed July 27, 1987, entitled Swing Check Valve With Hinge Pin Retainer.

BRIEF SUMMARY OF THE INVENTION

1. Field of the Invention

This invention relates to improvements in swing check valves.

2. Background of the Invention

Historically, when the valve body of a swing check valve has been made in two sections secured in end-to-end relation, the sections have been secured together by use of special threaded connections or mating circumferential flanges on the two sections bolted together. And, when a single piece body has been used with standard pipe thread connections at the opposite ends of the body, there has been provided an opening in the top of the valve body for the insertion and removal of the seat, clapper or disc and hanger for the clapper or disc. Such opening has historically been closed by a cap or bung threadedly connected to the body. These types of structures utilize excessive metal and machine work —resulting in an expensive valve construction.

DETAILED DESCRIPTION OF THE DRAWINGS

Figure 1:
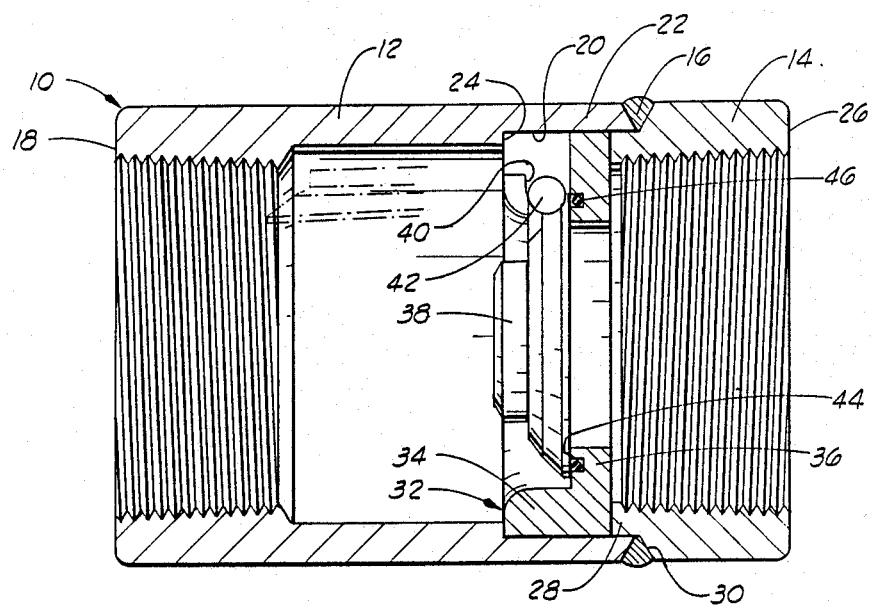
FIG. 1 is a cross-sectional view through a valve constructed pursuant to this invention.

Referring to the drawings in detail, and particularly FIG. 1, reference character 10 generally designates a swing check valve having a pair of tubular body sections 12 and 14 secured essentially in end-to-end relation by welding 16. One end 18 of the body section 12, sometimes referred to as the outer end, is internally threaded with a standard pipe thread for connection with one end of an adjacent pipe section (not shown). A counterbore 20 is formed in the opposite end 22 of the body section 12 to provide an annular shoulder 24 facing in the same direction as the end 22 of the body section 12.

One end 26 of the other body section 14 is also internally threaded with a standard pipe thread for connection with one end of an adjacent pipe section (not shown). The end 26 of the body section 14 is sometimes referred to as the outer end of that body section. The opposite end 28 of the body section 14 is reduced in diameter to slidingly fit in the end 22 of the body section 12 and is provided with an annular shoulder 30 facing in the same direction as the end 28 of the body section 14. The shoulder 30 and the adjacent end 22 of the body section 12 may be chamfered to facilitate the application of the welding 16.

A tubular member 32 fits in the counterbore 20 and is anchored between the shoulder 24 and the end 28 of the body section 14. The member 32 is shaped to provide a cage portion 34 and a valve seat portion 36. The cage portion 34 encircles over one half of the periphery of the valve disc 38 and is provided with a hinge pin recess 40 for journalling of the disc hinge pin 42 therein to form a hanger for the disc 38. As illustrated, the hinge pin 42 extends in a plane normal to the longitudinal axis of the disc 38. The seat portion 36 of the member 32 forms an annular valve seat 44 sized to mate with the seating face of the disc 38. A suitable sealing ring 46 may be provided in a cooperating annular groove in the seating face 44 to sealingly engage the disc 38 when the disc 38 is in a closed position as shown in FIG. 1.

Further details of construction of a combined cage and seat comparable to the member 32 are disclosed in my co-pending application Ser. No. 023,786, filed Mar. 9, 1987, and entitled Check Valve, the disclosure of which is incorporated herein by reference. Further details of the valve disc are discussed and disclosed later herein.

Prior to application of the welding 16, the body sections 12 and 14 are assembled as shown in FIG. 1 with the member 32 and clapper 38 in the positions shown in FIG. 1. Then, water is circulated through the valve while the welding 16 is applied. As indicated by the phantom lines in FIG. 1, the disc 38 can swing through an arc of approximately 90° from the position shown in FIG. 1 to a fully open position in order that water can be circulated through the valve during the welding operation. With this technique, the sealing ring 46 will remain in position and remain in good condition for operation of the valve. It should also be noted that since the hinge pin recess 40 opens or faces radially outwardly toward the walls of the counterbore 20, the hinge pin 42 will be held in the hinge pin recess 40 by gravity when the valve is oriented in the position shown in FIG. 1.

Figure 2:
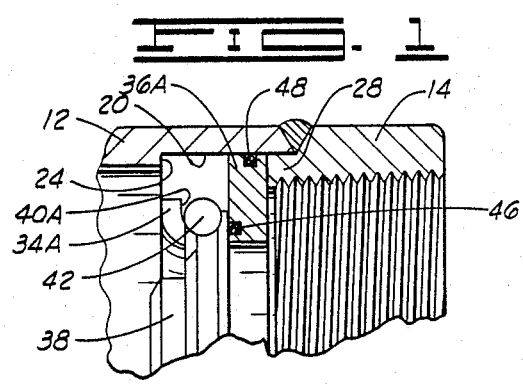
FIG. 2 is a partial cross-sectional view showing a modification of the valve of FIG. 1.

FIG. 2 illustrates a modification of the valve 10 wherein the valve seat member 36A and the cage member 34A are separate members in abutting relation and anchored between the annular shoulder 24 and the end 28 of the valve body section 14. The cage member 34A is provided with a hinge pin recess 40A facing the wall of the counterbore 20 to receive the hinge 42 of the disc 38. The valve seat member 36A is provided with a seal ring 46 to engage the seating face of the disc 38, as well as a sealing ring 48 mounted in a mating groove around the outer periphery of the seating member to sealingly engage the wall of the counterbore 20.

Further details of construction of the valve seat member 36A may be found in co-pending application Ser. No. 049,383, filed May 13, 1987, entitled Swing Check Valve. The disclosure in such application is incorporated herein by reference. The construction of the cage member 34A is the same as the cage portion 34 of the member 32 shown in FIG. 1, except for being separate from the valve seat.

Figure 3:
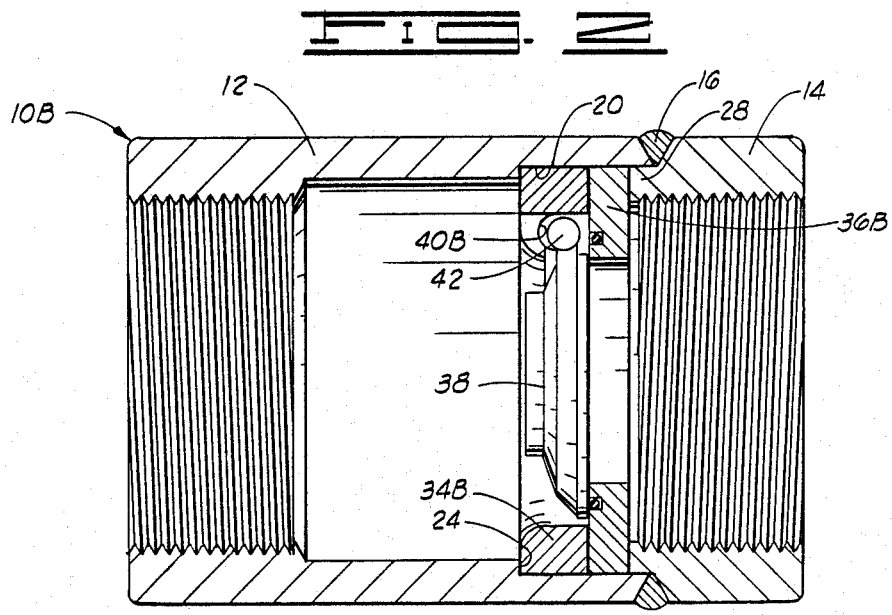
FIGS. 3, 4, 5 and 6 are cross-sectional views through other forms of valves constructed pursuant to this invention.

The valve 10B shown in FIG. 3 utilizes the body sections 12 and 14 interconnected by welding 16. The annular valve seat 36B is constructed in the same manner as the valve seat 36A previously described, except that the seat 36B does not have a sealing ring in the outer periphery thereof.

The cage member 34B surrounds more than one half of the periphery of the disc 38 and is provided with a hinge pin recess 40B facing the valve seat 36B for receiving the hinge pin 42 of the disc 38. Thus, the hinge pin 42 is trapped in the hinge pin recess 40B by the valve seat 36B to hold the valve disc 38 in operating position. The cage member 34B is shown in more detail in FIGS. 2 and 3 of co-pending application Ser. No. 049,383, filed May 13, 1987, entitled Swing Check Valve. The disclosure of such application is incorporated herein by reference.

In operation, the cage member 34B and seat member 36B are anchored between the annular shoulder 24 and the end 28 of the body section 14. With this arrangement, the disc 38 can swing in a clockwise direction from the position shown in FIG. 3 through approximately 90° for a full opening of the valve 10B.

Figure 4:
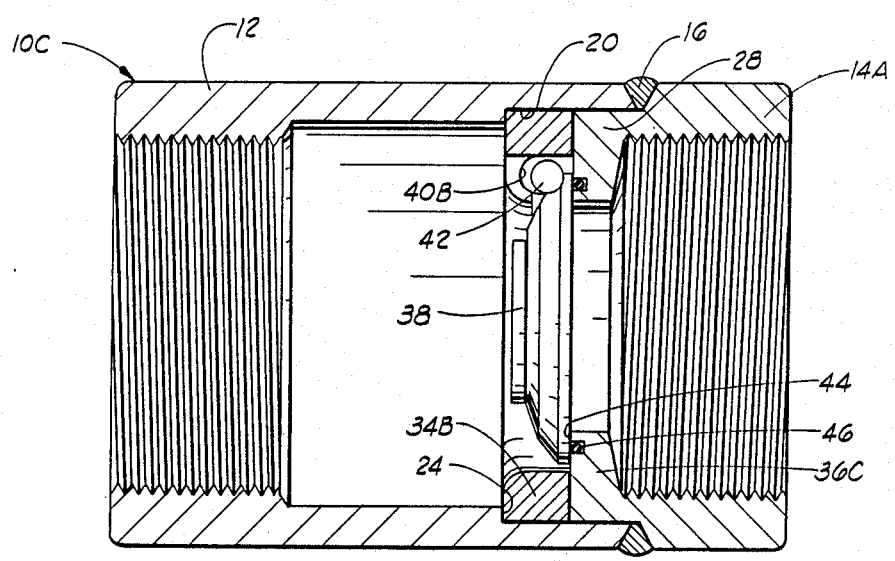

The valve 10C shown in FIG. 4 utilizes the body section 12 and a modified body section 14A interconnected by the welding 16. The body section 14A is modified only in that the inner end portion 28 thereof is extended radially inward to form an annular valve seat member 36C which has a sealing ring 46 in the seating face 44 thereof to sealingly engage the disc 38. A valve cage member 34B is anchored between the end 28 of the modified body section 14A and the shoulder 24. The cage member 34B is constructed in the same manner as the cage member 34B previously described in connection with FIG. 3 to surround and support the disc 38. In this construction, the hinge pin recess 40B in the cage member 34B faces the valve seat member 36C, such that the valve seat member 36C will trap the hinge pin 42 in the hinge pin recess.

Figure 5:
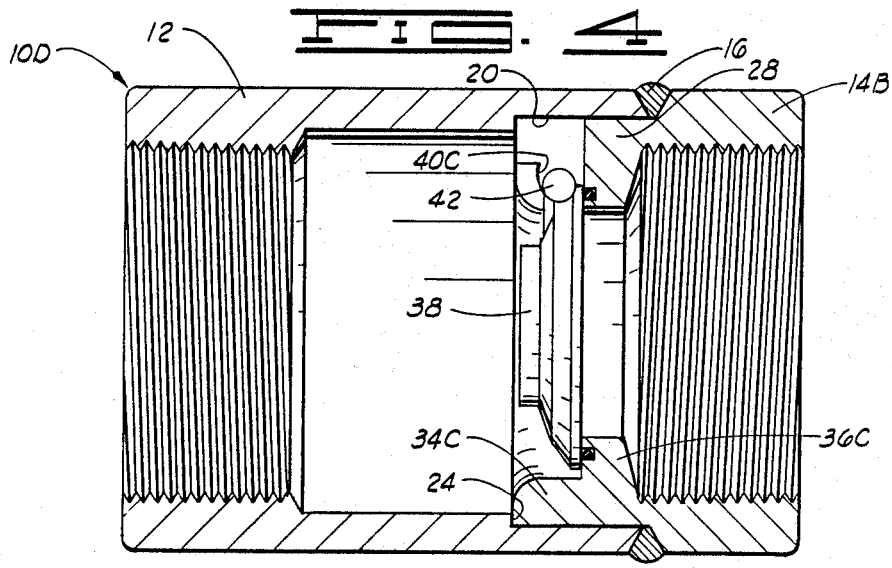

The valve 10D shown in FIG. 5 utilizes the tubular body section 12 and another modified tubular body section 14B interconnected by the welding 16. In this construction, the modified body section 14B has an inwardly extending annular seat portion 36C formed on the inner end 28 thereof to receive the disc 38 when the valve is closed. The modified body section 14B varies from the modified body section 14A, however, in that a cage portion 34C extends from the seat portion 36C to surround more than one half the periphery of the disc 38. As shown in FIG. 5, when the valve 10D is fully assembled, the cage member 34C abuts the annular shoulder 24. The hinge pin recess 40C in the cage member 34C opens radially outward with respect to the cage, facing the wall of the counterbore 20. Thus, the hinge pin 42 will be retained in the hinge pin recess 40C by the action of gravity when the valve is oriented as shown in FIG. 5.

The valve seat 36C and cage 34C formed integrally with the tubular body section 14B is disclosed in more detail in FIGS. 19 and 20 of co-pending application Ser. No. 049,383, filed May 13, 1987, entitled Swing Check Valve, with the exception that the cage section shown in this co-pending application is externally threaded; whereas the cage portion 34C of the present structure slidingly fits in the counterbore 20. The disclosure in said copending application is incorporated herein by reference.

Figure 6:
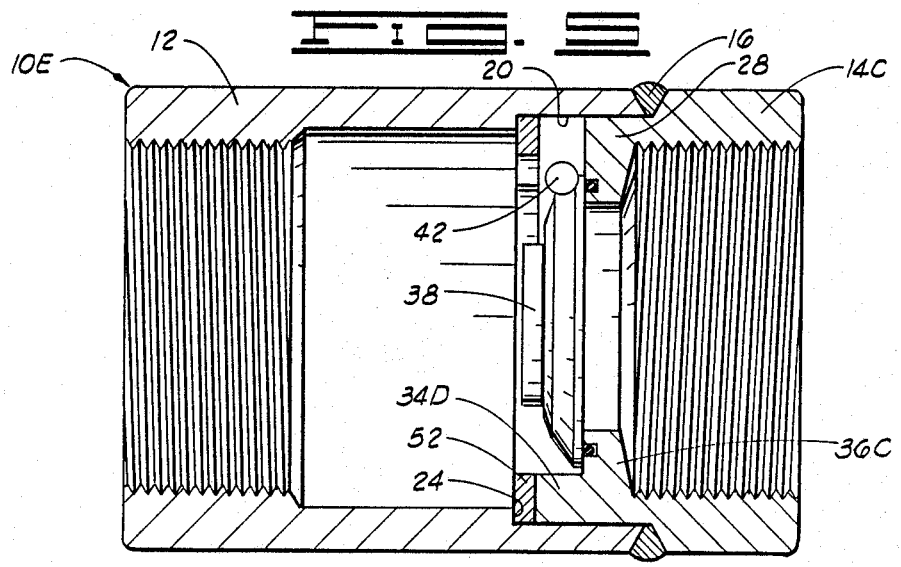
Figure 7:
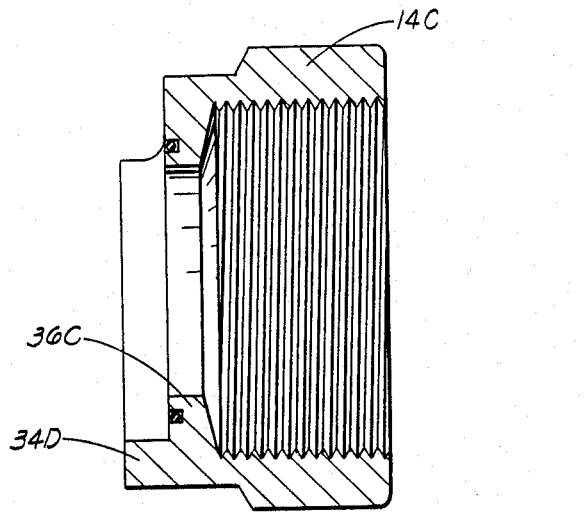
FIG. 7 is a cross-sectional view of that section of the valve body shown at the right hand end of FIG. 6.
Figure 8:
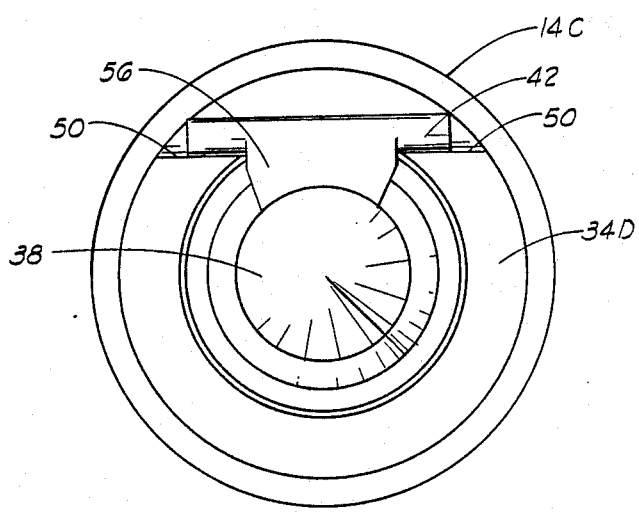
FIG. 8 is an elevational view looking at the left hand end of the body section shown in FIG. 7, with the valve disc in a closed position.
Figure 9:
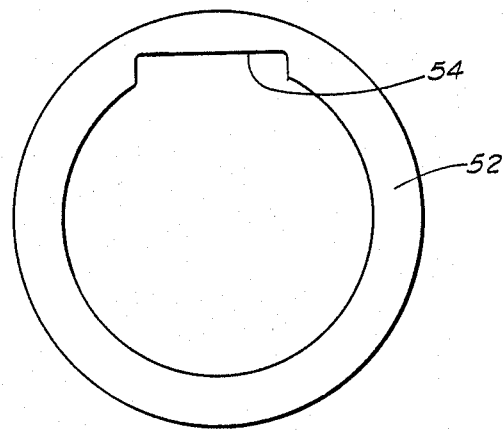
FIG. 9 is an elevational view of the retainer for the hinge pin of the valve shown in FIGS. 6, 7 and 8.

The valve 10E shown in FIG. 6 utilizes the tubular body section 12 and another modified tubular body section 14C interconnected by the welding 16. The body 14C is modified to include an annular inwardly extending portion on the inner end 28 thereof forming a valve seat member 36C and a cage portion 34D surrounding more than one half the periphery of the disc 38. As shown in FIGS. 7 and 8, the cage section 34D is in the form of an interrupted ring. The free ends 50 thereof form shoulders or ledges on which the opposite end portions of the hinge pin 42 are supported for swinging movement of the disc 38.

The opposite end portions of the hinge pin 42 are trapped on the shoulders 50 by a retaining ring 52 anchored between the adjacent end of the cage portion 34D and the annular shoulder 24. The inner diameter of the retaining ring 52 is sized such that the retaining ring will overlap the end portions of the hinge pin 42 when the valve is assembled as shown in FIG. 6. However, the retaining ring 52 is provided with an opening 54 in the inner periphery thereof sized to correspond with the width of the transition 56 which extends between the main body portion of the disc 38 and the central portions of the hinge pin 42. With this arrangement, the disc 38 is free to swing through the retaining ring 52 during the opening movement of the valve, such that the disc 38 can move to approximately a position 90° from that shown in FIG. 6 without interference with the retaining ring 52.

In all embodiments of this invention, the welding 16 is preferably applied while water is being circulated through the valve to protect the various sealing rings employed. Also, in all embodiments of this invention, the opposite ends of the valve body are preferably provided with standard pipe threads, such that the valve is of the most economical construction. It is contemplated when such a valve malfunctions, as, for example, by leaking, the entire valve will be replaced. However, if desired, the valve seat, cage and/or disc and hinge pin may be formed of a highly durable metal, such as stainless steel, to provide a long lasting structure. With that arrangment, the valve body can still be constructed of a more economical material and yet provide an effective, long lasting valve.

Changes may be made in the combination and arrangement of parts or elements as heretofore set forth in the specification and shown in the drawings without departing from the spirit and scope of the invention as defined in the following claims.

What is claimed is:

1. A valve for installation in adjacent sections of a pipe,
   a body, comprising:
   a first, tubular body section having one end thereof adapted for connection with an adjacent pipe section, and having a counterbore in the opposite end thereof forming an annular shoulder facing in the same direction as said opposite end;
   a second tubular body section having one end thereof adapted for connection with an adjacent pipe section, and having its opposite end welded to said opposite end of the first body section;
   an annular seat secured in said counterbore;
   a disc in the body having a hinge pin and supported for swinging movement to and from the seat for closing and opening the valve; and a cage member secured in said counterbore surrounding a portion of the disc when the disc is in engagement with the seat, a portion of the cage member forming a hanger for the disc hinge pin.

2. A valve as defined in claim 1 wherein said one end of the first, tubular body section and said one end of the second, tubular body section are internally threaded.

3. A valve as defined in claim 1 wherein the seat and cage member are formed integrally as parts of the same member.

4. A valve as defined in claim 3 wherein said same member is secured between and in engagement with the said annular shoulder and said opposite end of the second tubular body section.

5. A valve as defined in claim 1 wherein the seat and cage member are separate members anchored between said annular shoulder and said opposite end of the second tubular body section.

6. A valve as defined in claim 1 wherein the seat has a seal ring therein to sealingly engage the disc.

7. A valve as defined in claim 1 wherein the seat and cage member are separate members anchored between said annular shoulder and said opposite end of the second tubular body section, and wherein:

the hanger comprises a hinge pin recess in the cage member facing the seat.

8. A valve as defined in claim 1 wherein the seat is formed on said opposite end of the second tubular body section.

9. A valve as defined in claim 8 wherein the hanger comprises a hinge pin recess formed in the cage member facing the seat.

10. A valve as defined in claim 1 wherein the seat and cage member are formed integrally with said opposite end of the second tubular body section.

11. A valve as defined in claim 10 wherein the hanger comprises a hinge pin recess in the cage member facing radially outwardly with respect to the cage member.

12. A valve as defined in claim 1 wherein the hanger comprises a ledge on the cage member facing radially outwardly from the cage member on which the hinge pin rests, and characterized further to include:

a retainer plate in the counterbore engaging the cage member sized to hold the hinge pin on the ledge.

13. A valve as defined in claim 12 wherein the disc has a transition between the disc and the medial portion of the hinge pin, and wherein:

the retainer ring has an opening therein sized to receive the transition when the disc is swung away from the seat.

14. A valve as defined in claim 12 wherein the seat and cage member are formed integrally with said opposite end of the second tubular body section.

15. A valve as defined in claim 1 characterized further to include a sealing ring in the outer periphery of the seat engaging the periphery of said counterbore.

* * * * *